(12) United States Patent
Flinn

(10) Patent No.: US 9,254,622 B2
(45) Date of Patent: Feb. 9, 2016

(54) BOND PLY FOR ADHESIVE BONDING OF COMPOSITES AND ASSOCIATED SYSTEMS AND METHODS

(71) Applicant: Brian D. Flinn, Seattle, WA (US)

(72) Inventor: Brian D. Flinn, Seattle, WA (US)

(73) Assignee: University of Washington, Seattle, WA (US)

( * ) Notice: Subject to any disclaimer, the term of this patent is extended or adjusted under 35 U.S.C. 154(b) by 115 days.

(21) Appl. No.: 13/868,963

(22) Filed: Apr. 23, 2013

(65) Prior Publication Data

US 2013/0280488 A1      Oct. 24, 2013

Related U.S. Application Data

(60) Provisional application No. 61/636,954, filed on Apr. 23, 2012.

(51) Int. Cl.
*B32B 3/26* (2006.01)
*B32B 38/10* (2006.01)
*B32B 7/06* (2006.01)
(Continued)

(52) U.S. Cl.
CPC ............... *B32B 3/263* (2013.01); *B29C 59/022* (2013.01); *B29C 65/48* (2013.01); *B29C 66/02* (2013.01); *B29C 66/721* (2013.01); *B29C 66/72141* (2013.01); *B29C 66/72143* (2013.01); *B29C 66/73755* (2013.01); *B29C 70/00* (2013.01); *B32B 5/02* (2013.01); *B32B 5/022* (2013.01); *B32B 5/024* (2013.01); *B32B 5/26* (2013.01); *B32B 7/06* (2013.01); *B32B 38/10* (2013.01); *C08J 5/18* (2013.01); *C09J 5/00* (2013.01); *B29C 59/025* (2013.01); *B29C 66/02245* (2013.01); *B29C 66/71* (2013.01);
*B29C 66/7212* (2013.01); *B29C 66/7392* (2013.01); *B29C 66/7394* (2013.01); *B29C 66/73161* (2013.01); *B32B 2260/021* (2013.01); *B32B 2260/046* (2013.01); *B32B 2262/0269* (2013.01); *B32B 2262/101* (2013.01); *B32B 2262/103* (2013.01);
(Continued)

(58) Field of Classification Search
USPC ........................................................ 156/247
See application file for complete search history.

(56) References Cited

U.S. PATENT DOCUMENTS 4,783,362 A * 11/1988 Thornton et al. ............. 442/203
5,879,492 A *  3/1999 Reis et al. ...................... 156/72
(Continued)

OTHER PUBLICATIONS

Hart-Smith, L.J. et al., "The Curse of the Nylon Peel Ply," Proceedings from 41st Int'l. SAMPE Symposium, Anaheim, California, pp. 1-25 (Mar. 25-28, 1996).
(Continued)

*Primary Examiner* — Christopher Schatz
*Assistant Examiner* — Marta Dulko
(74) *Attorney, Agent, or Firm* — Perkins Coie LLP

(57) ABSTRACT

A method of forming a composite material includes providing an uncured substrate. The method further includes applying a bond ply to the substrate and a peel ply to the bond ply. In some embodiments, the bond ply comprises a fiber veil, such as a glass fiber veil. The method further includes curing the substrate and removing the bond ply and peel ply from the cured substrate, thereby exposing an active surface on the substrate. Removing the bond ply and peel ply can create fractures in the active surface that increase the roughness and bondability of the active surface. In several embodiments, the composite materials described herein can be compatible with a wide range of adhesives, including room temperature adhesives.

15 Claims, 6 Drawing Sheets

(51) Int. Cl.
  *B29C 65/00* (2006.01)
  *B29C 70/00* (2006.01)
  *B29C 59/02* (2006.01)
  *B29C 65/48* (2006.01)
  *C09J 5/00* (2006.01)
  *C08J 5/18* (2006.01)
  *B32B 5/02* (2006.01)
  *B32B 5/26* (2006.01)

(52) U.S. Cl.
  CPC .... *B32B 2262/106* (2013.01); *Y10T 428/24364* (2015.01)

(56) References Cited

U.S. PATENT DOCUMENTS

| | | | |
|---|---|---|---|
| 6,645,610 | B1 | 11/2003 | Reis et al. |
| 8,168,027 | B2 * | 5/2012 | Jacobsen et al. ............. 156/247 |
| 2005/0124253 | A1 | 6/2005 | Lauridsen |
| 2009/0023018 | A1 | 1/2009 | Oh et al. |
| 2009/0239018 | A1 * | 9/2009 | Aijima ......................... 428/40.1 |
| 2010/0047560 | A1 | 2/2010 | Salnikov et al. |
| 2012/0115388 | A1 * | 5/2012 | Baidak et al. ................. 442/393 |
| 2013/0115442 | A1 * | 5/2013 | Sang et al. .................... 428/327 |
| 2013/0129957 | A1 * | 5/2013 | Zhao ....................... C09J 7/041 428/40.1 |

OTHER PUBLICATIONS

Hart-Smith, L.J. et al., "Surface Preparations for Ensuring that Glue Will Stick in Bonded Composite Structures," Handbook of Composites, Van Nostrand Reinhold, Chap. 29; pp. 667-685 (1998).
Bardis and Kedward, "Effects of Surface Preparation on the Long-Term Durability of Adhesively Bonded Composite Joints," DOT/FAA/AR-03/53, Office of Aviation Research and Development, Washington, DC (Jan. 2004).
Baldan, A., "Adhesively-bonded joints and repairs in metallic alloys, polymers and composite materials: Adhesives, adhesion theories and surface pretreatment," J. of Material Sci., 39: 1-49 (2004).
Flinn et al, "Peel Ply Surface Preparation Variable and Their Effect on Bond Quality," SAMPE Conference Long Beach, California (2005).
Phariss et al., "Evaluation of Peel-Ply Materials on Composite Bond Quality," SAMPE Fall Technical Conf. (37th ISTC) Seattle, WA (2005).
Flinn and Phariss, "The Effect of Peel-Ply Surface Preparation Variables and on Bond Quality," DOT/FAA/AR-06/28, Office of Aviation Research and Development, Washington, DC (Aug. 2006).
Clark and Flinn, "Evaluation of Nylon and Polyester Peel Plies Using the Rapid Adhesion Test," SAMPE Conf., Seattle, WA (Jun. 3-7, 2007).
Flinn et al., "Effect of Laminate Cure Conditions on Bond Quality of Peel Ply Prepared Surfaces," SAMPE Conf., Baltimore, MD (2009).
Hickmott and Flinn, "Effect of Surface Preparation Technique on Bond Quality of Agate Composite Laminates," SAMPE Conf., Baltimore, MD (2009).

* cited by examiner

320a

320b

BOND PLY FOR ADHESIVE BONDING OF COMPOSITES AND ASSOCIATED SYSTEMS AND METHODS

CROSS-REFERENCE TO RELATED APPLICATION

The present application claims the benefit of U.S. Provisional Patent Application No. 61/636,954, filed Apr. 23, 2012. The foregoing application is incorporated herein by reference in its entirety. Further, components and features of embodiments disclosed in the application incorporated by reference may be combined with various components and features disclosed and claimed in the present application.

TECHNICAL FIELD

The present technology relates generally to adhesive bonding of composites, and associated systems and methods. Particular embodiments are directed to surface preparation methods using bond ply for subsequent adhesive bonding, painting, or other surface functionalization.

BACKGROUND

Composite materials are made from two or more constituent materials with significantly different physical or chemical properties that, when combined, produce a material with characteristics different from the individual components. Composite materials are used across many industries, including aircraft manufacturing. Adhesive bonding of composite parts in aircraft structures can be more desirable than other joining methods due to higher joint stiffness and superior fatigue performance for the bonded segment.

In order to obtain high quality, strong adhesive bonds, there are two main considerations: proper surface preparation and the choice of adhesive/adherend. A freshly cleaned surface is required, as the surface may absorb gases, release agents, or other contamination that inhibit bonding. Further, the adhesive must spread out or "wet" the surface of the adherend (i.e., the composite substrate). Wetting is mostly controlled by the surface energy of the adhesive and adherend. In order for an adhesive to wet the adherend, the surface energy of the substrate must be higher than the surface energy of the adhesive. Roughness can increase the surface energy, creating a better surface for bonding. Roughness requirements can be satisfied by abrasive surface preparation techniques and proper cleaning prior to bonding. However, in order to avoid time- and labor-intensive abrasive surface preparation methods, such as sanding and grit blasting, peel ply surface preparation has become a common method of producing acceptable bonding surfaces for some applications.

A peel ply is a woven synthetic fabric that is added as a layer to an adherend substrate and cured to the substrate prior to adhesive bonding. In some peel ply methods, during curing, the viscosity of a resin (e.g., epoxy resin, polyester resin, vinyl ester resin, bismaleimides resin, etc.) in the preimpregnated ("prepreg") substrate drops and allows the resin to flow and impregnate the peel ply between the fibers and in gaps where warp and weft meet. This imprints the channeled characteristics of the peel-ply material on the composite surface. After curing, the peel ply is then removed from the substrate surface immediately before bonding or analysis. In other peel ply methods (e.g., vacuum assisted resin transfer molding), unimpregnated ("dry") fibers are infused with resin after they have been placed on the substrate. While traditional peel ply surface preparation methods leave behind traces of the peel ply fiber (e.g., polymers) on the substrate surface that inhibit adhesive bonding at room temperature, these methods have proven to be successful in achieving acceptable surface chemistries when bonding composite parts at elevated temperatures.

DETAILED DESCRIPTION

The present technology relates generally to bond ply adhesive bonding of composites, and associated systems and methods. In some embodiments, a method of forming a composite material includes providing an uncured substrate. The method further includes applying a bond ply to the substrate and a peel ply to the bond ply. In some embodiments, the bond ply comprises a fiber veil, such as a glass fiber veil. The method further includes curing the substrate and removing the bond ply and peel ply from the cured substrate, thereby exposing an active surface on the substrate. Removing the bond ply and peel ply can create fractures in the active surface that increase the roughness and bondability of the active surface. In several embodiments, the composite materials described herein can be compatible with a wide range of adhesives, including room temperature adhesives.

Specific details of several embodiments of the technology are described below with reference to FIGS. 1-5. Other details describing well-known structures and systems often associated with adhesives and composite materials have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-5.

Figure 1:
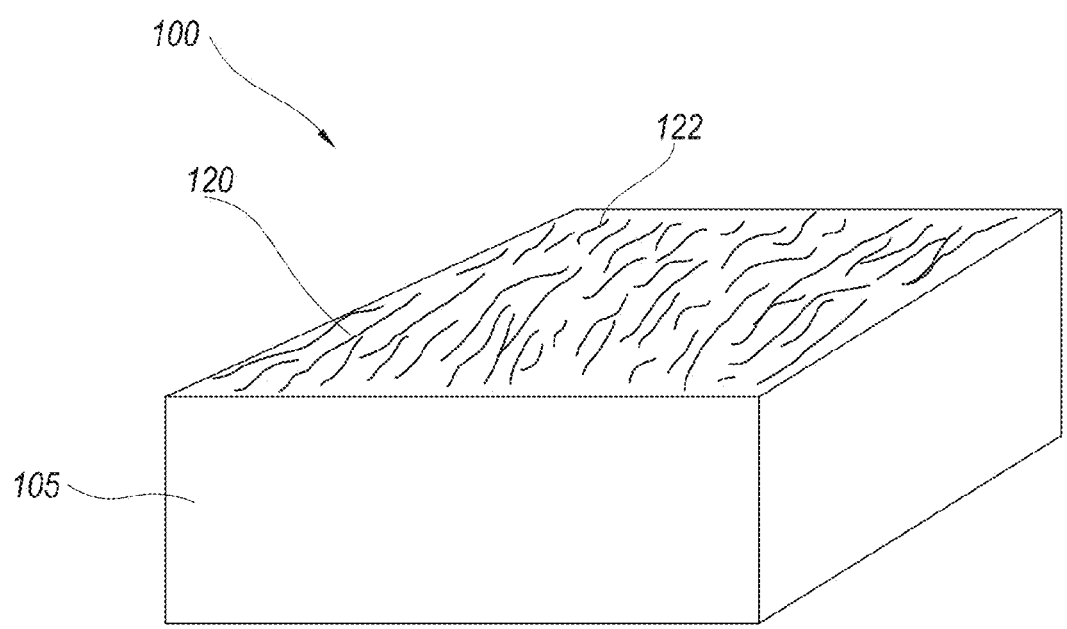
FIG. 1 is a schematic illustration of a composite material configured in accordance with embodiments of the technology.

FIG. 1 is a schematic illustration of a composite material 100 configured in accordance with embodiments of the technology. The composite material 100 includes a composite substrate 105 having an active surface 120 created through the use of a bond ply treatment, described in further detail below with reference to FIGS. 2A-2C. As discussed above, in order for an adhesive to sufficiently wet an adherend (i.e., the substrate 105), the surface energy of the active surface 120 must be higher than the surface energy of the adhesive. The bond ply treatment provides a clean active surface 120 (with minimal or no detrimental residue) and increases the surface energy of the active surface 120 by creating roughness and fractures 122 in the active surface 120. The increased surface energy of the active surface 120 allows the substrate 105 to be compatible with a wide range of adhesives, including paste adhesives applied at room temperature.

Figure 2A:
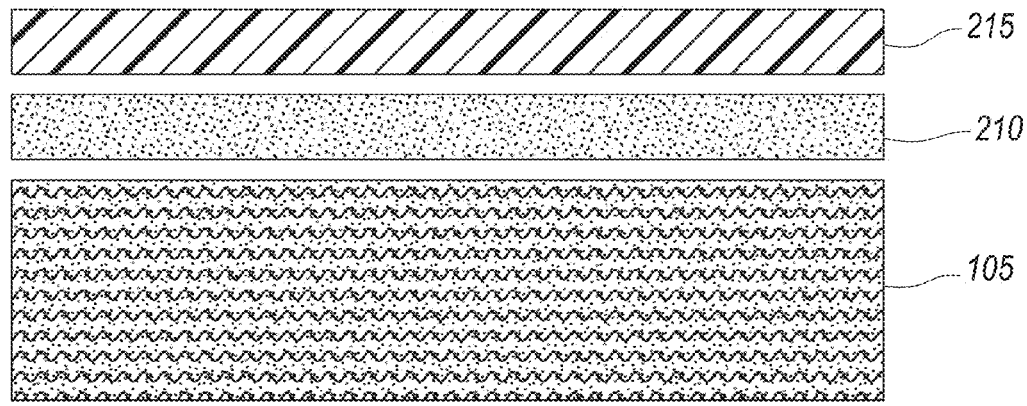
FIGS. 2A-2C illustrate steps of forming the composite material of FIG. 1 in accordance with embodiments of the technology.
Figure 2B:
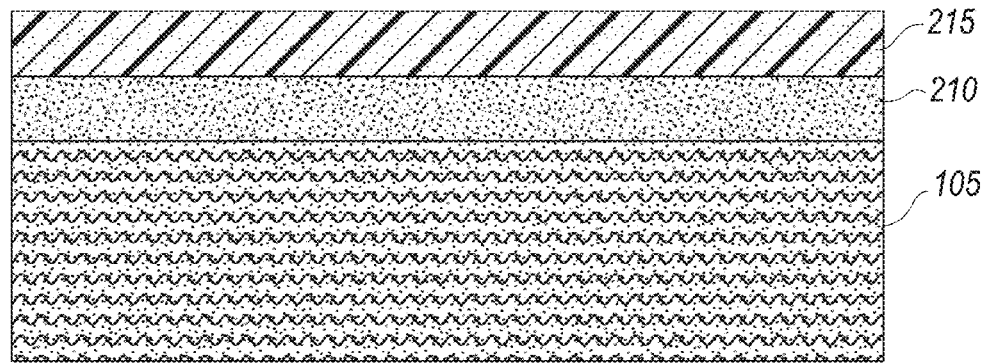
Figure 2C:
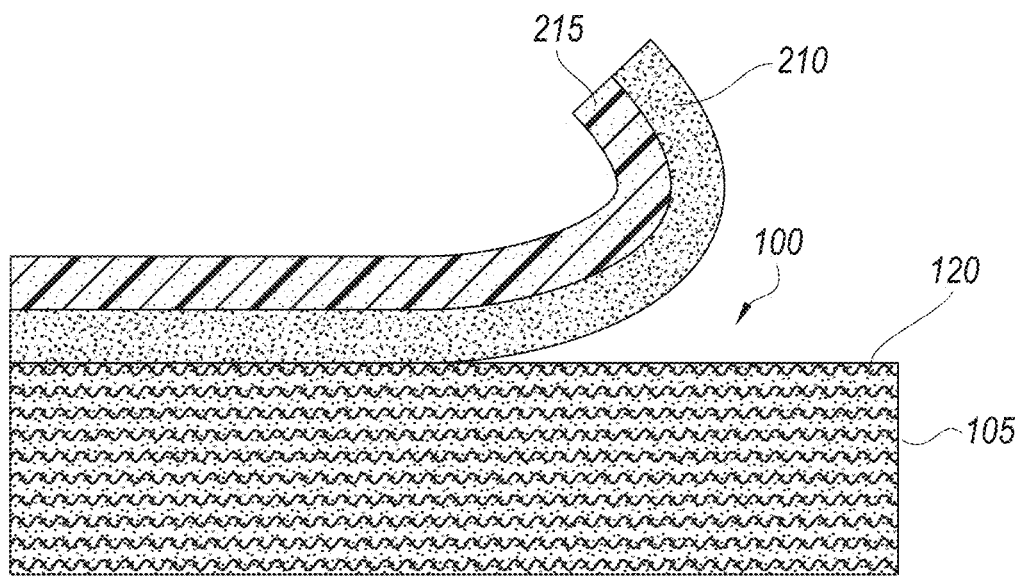

FIGS. 2A-2C illustrate steps of forming the composite material 100 of FIG. 1 in accordance with embodiments of the technology. Referring first to FIG. 2A, a bond ply 210 is positioned on a surface of the substrate 105. In several embodiments, the substrate 105 comprises fibers and/or uncured resin. The substrate 105 can be preimpregnated with the uncured resin or can be unimpregnated. For example, the substrate 105 can be a preimpregnated material of epoxy and carbon or glass fiber. In some embodiments, the substrate 105 comprises an uncured thermosetting polymer preimpregnated with at least one fiber. In further embodiments, a thermoplastic polymer can be used. In a particular embodiment, the substrate 105 comprises a carbon fiber reinforced, epoxy-preimpregnated woven fabric 8-ply laminate. The substrate can be cut or formed to a desired shape.

The bond ply 210 can comprise a variety of materials in various embodiments of the technology. In some embodiments, the bond ply 210 comprises a material that does not react or has limited reaction with epoxy in the substrate 105. In some embodiments, the bond ply 210 can comprise a fiber mat (e.g., a mat of bundles of "chopped", splintered, or otherwise segmented fibers) or a fiber veil (e.g., a veil of individual chopped, splintered, or otherwise segmented fiber). In particular embodiments, the fibers comprise glass, carbon, one or more metals, aramide (e.g., Kevlar®), materials inert to the resin in the substrate 105, preimpregnated fibers, unimpregnated fibers, elongated fibers, non-elongated fibers, a combination of these materials, or other materials. In some embodiments, a Fiberlay Surface Veil or a Chopped Strand Mat, both manufactured by Orca Composites (Seattle, Wash.), can be used. In a particular embodiment, a 0.75 oz/yd$^2$ fiber mat can be used, but the fiber mat or fiber veil can have other densities in further embodiments. In various embodiments, the fibers are randomly oriented or oriented in a particular pattern or orientation (e.g., linear, cross-weave, overlapping, single fibers or groups of fibers, non-bundled, etc.). In various embodiments, the length or shape of individual fibers can be selected for a desired type of interface with or patterning on the substrate 105.

The bond ply 210 may be woven or non-woven. For example, the bond ply 210 can be a cowoven fabric, with traditional peel ply fibers cowoven with inert fibers such as glass. In some embodiments, the bond ply 210 comprises a layer of fabric having short fibers therein. In further embodiments, the bond ply 210 and/or substrate 105 can be coated or otherwise treated with a coating material to improve templating and/or surface transferring onto the substrate 105. The bond ply 210 can be applied to the substrate 105 with or without a release agent. In some embodiments, fibers in the bond ply 210 are not embedded in the substrate 105, but instead sit on or above the surface of the substrate 105. For example, the fibers can be substantially planar with the surface of the substrate 105.

A peel ply 215 is placed on the bond ply 210. As discussed above, the peel ply 215 is a sacrificial layer that can comprise various materials known in the art, such as woven fabric. In particular embodiments, the peel ply 215 comprises a polyester or nylon fabric. In some embodiments, fibers in the bond ply 210 have a greater tensile strength than fibers in the peel ply 215. In further embodiments, the peel ply 215 comprises a multi-layer material having both peel ply and bond ply properties (e.g., a material having inert fibers embedded in a traditional peel ply fabric). While the illustrated embodiment shows a single bond ply 210 layer and a single peel ply 215 layer, in further embodiments there can be more or fewer than one layer of the bond ply 210 and/or the peel ply 215.

Referring next to FIG. 2B, the substrate 105 is cured, causing the preimpregnated resin in the substrate 105 to flow into the bond ply 210 and peel ply 215. In at least some embodiments, curing the substrate 105 forms a resin and/or epoxy layer along and/or among fibers of the bond ply 210. In some embodiments, curing the substrate 105 comprises vacuum-curing the substrate 105 for a period of time. In a particular embodiment, the substrate 105 is cured at 350° F. in an autoclave at 85 psi for approximately two hours. In further embodiments, other methods, pressures, temperatures, or durations of curing can be used.

As shown in FIG. 2C, after curing the composite material 100 is formed when bond ply 210 and peel ply 215 are removed from the substrate 105 to expose the active surface 120. In some embodiments, the bond ply 210 and peel ply 215 are removed together as a unitary structure, while in other embodiments the bond ply 210 and peel ply 215 are separately removed from the substrate 105. In some embodiments, the bond ply 210 and peel ply 215 are removed from the substrate 105 by peeling these materials from the substrate 105, while in further embodiments other removal techniques such as etching, sanding, chemical removal, thermal removal or other procedure can be used. In some embodiments, the fibers in the bond ply 210 are unfractured in the peeling process. There may be few or no remnants of the peel ply 215 and/or bond ply 210 remaining on the active surface 120 after the bond ply 210 has been removed, and the bond ply 210 fibers may be substantially removed from the substrate 105 during the bond ply 210 removal process. In some embodiments, for example, 10%-50% or fewer of the bond ply 210 fibers are left as remnants on the active surface 120. Remnants from the bond ply 210 left behind on the active surface 120 may not be detrimental to adhesive bonding because the bond ply fibers can form strong bonds to adhesive. However, in several embodiments, such remnants are neither central nor essential to forming an improved bonding surface.

In several embodiments, removing the bond ply 210 and peel ply 215 reveals fractures on the active surface 120 of the cured substrate 105. In some embodiments, the fractures occur in the epoxy layer that is formed among the bond ply 210 fibers upon curing. For example, in some embodiments, a majority of the fractures occur within the epoxy layer rather than along the surface of the fibers of the removed bond ply 210. In various embodiments, the degree of fracture and/or the fracture pattern on the active surface 120 can be selected and controlled by selection of bond ply material. For example, a bond ply 210 comprising short fibers can fracture along these short fibers. Similarly, a bond ply 210 can comprise a porous material or form a porous region upon curing, where the porosity directs where fracture occurs. In further embodiments, the degree of fracture and/or the fracture pattern on the active surface 120 can be selected and controlled by materials chosen for the substrate 105 or peel ply 215; by selection of the curing process or time; and/or by the removal technique (i.e., the technique for removing the bond ply 210 and peel ply 215 from the substrate 105). In some embodiments, a strip of release film (e.g., fluorinated ethylene propylene "FEP" release film) can be placed on a portion (e.g., an edge or corner) of the substrate 105 before the bond ply 210 is applied in order to create a crack starter. In some embodiments, one or more shims can be placed on or in the substrate 105 to control fracture thickness.

Figure 3A:
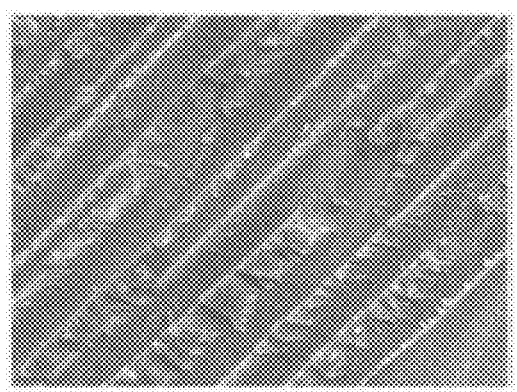
FIGS. 3A and 3B are top view photographs of active surfaces of a composite material configured in accordance with embodiments of the technology.
Figure 3B:
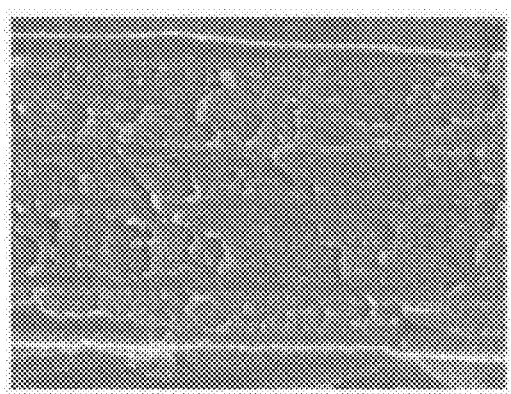

FIGS. 3A and 3B are top view photographs of portions of active surfaces 32a, 320b (collectively "active surface 320") created using the bond ply treatments described above, and configured in accordance with embodiments of the technology. The illustrated active surfaces 320a, 320b are merely representative of embodiments of the technology, and can have other configurations and patterns in further embodiments of the technology. The fractured active surface 320 can be a suitable bonding surface with a large area fraction of fractured matrix resin and surface roughness. The surface roughness increases the surface energy of the adherend, which can be beneficial to bonding and can allow for the use of room-temperature paste adhesives. In some embodiments, the active surface 320 allows the substrate to be universally compatible with any adhesive regardless of the paste's temperature of activation. For example, in some cases, the active surface 320 created using the bond ply techniques can have an equal degree of roughness as a sanded surface.

In addition to a suitable roughness, the active surface 320 can be developed to have other desired surface characteristics, such as lubricity, paintability, conductivity, etc. These characteristics can be developed by transferring the required elements from a treated bond ply 210, peel ply 215, or other material that is placed on the substrate 105 (shown in FIGS. 2A-2C) and then removed. Bond ply removal may be done in conjunction with various processing procedures, such as after heating, pressing, after storage, before painting, etc. to achieve a desired surface characteristic. In a particular embodiment, the active surface 320 may include a multi-functional layer, such as, for example, a layer having electrical conductivity for lightning strike protection.

Figure 4:
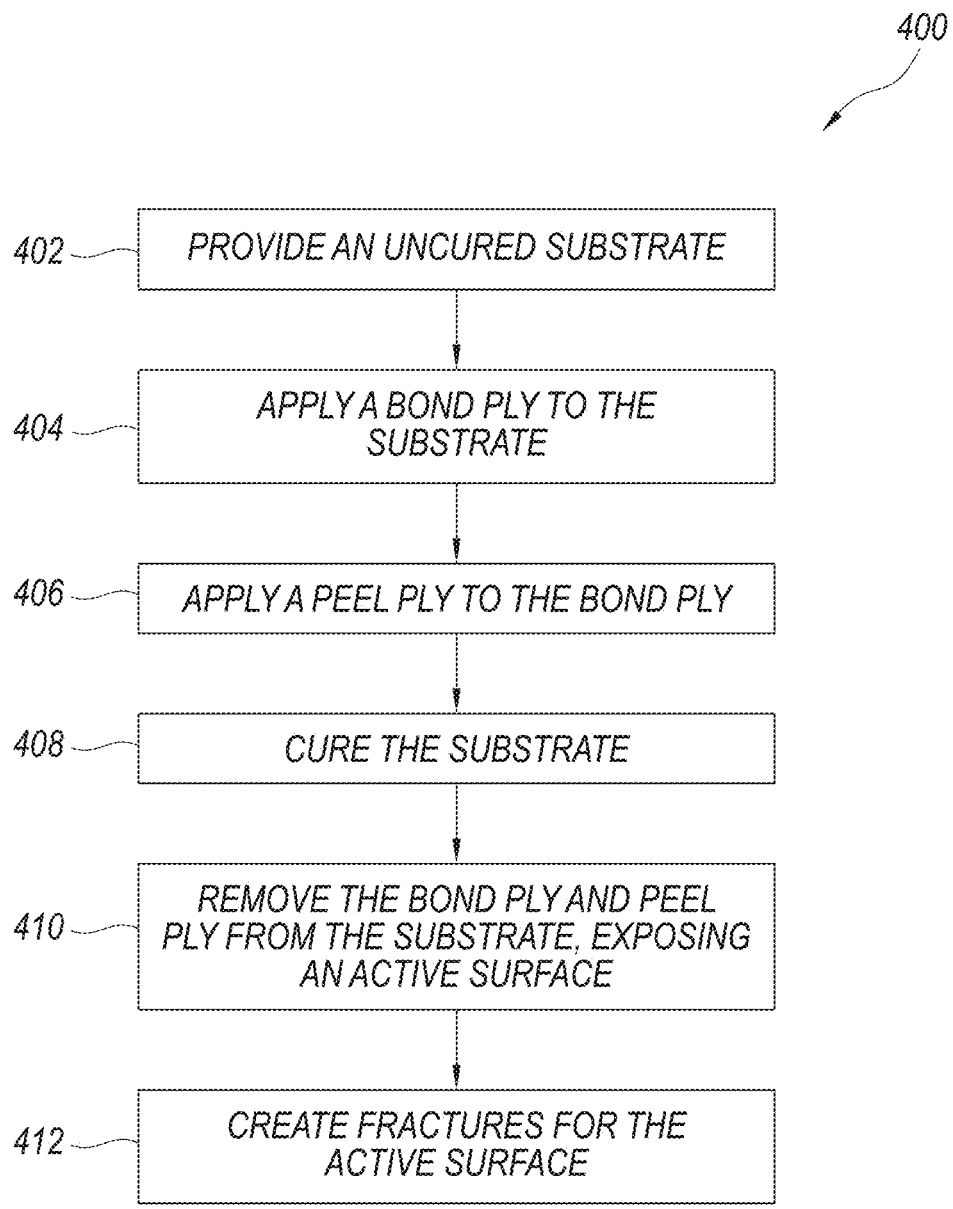
FIG. 4 is a block diagram illustrating a method of forming a composite material in accordance with embodiments of the technology.

FIG. 4 is a block diagram illustrating a method 400 of forming a composite material in accordance with embodiments of the technology. At block 402, the method 400 includes providing an uncured substrate. The substrate can comprise any of the materials described above, such as one or more of an epoxy resin, a thermosetting polymer, and/or a thermoplastic polymer.

At blocks 404 and 406, the method 400 includes applying a bond ply to the substrate and a peel ply to the bond ply. In some embodiments, the bond ply comprises a fiber veil comprising one or more of glass, carbon, one or more metals, aramide, or a combination of these materials. In a particular embodiment, the bond ply comprises a veil of randomly oriented glass fibers.

At block 408, the method 400 further includes curing the substrate. In some embodiments, curing the substrate comprises infusing the bond ply and peel ply with resin from the substrate. At block 410, the method 400 includes removing the bond ply and the peel ply from the substrate to create and expose an active surface of the substrate. In some embodiments, the bond ply and peel ply are removed together as a unitary component. Removing the bond ply and the peel ply from the substrate may comprise removing the bond ply and peel ply without leaving a significant amount of remnants of the bond ply or peel ply on the substrate.

At block 412, the method 400 includes creating fractures for the active surface. In some embodiments, creating the fractures includes creating fractures in at least a portion of the resin infused in the bond ply. For example, in some embodiments, a majority of the fractures created for the composite material may occur within the infused resin itself, rather than along or within the fibers of the bond ply. In some embodiments, creating fractures for the active surface comprises creating a fracture pattern dependent on one or more of a bond ply material selection, an orientation, length, or density of fibers in the bond ply, or a method of curing the substrate. In some embodiments, the method 400 further includes providing a surface chemistry on the active surface suitable for use with a room temperature adhesive.

Figure 5:
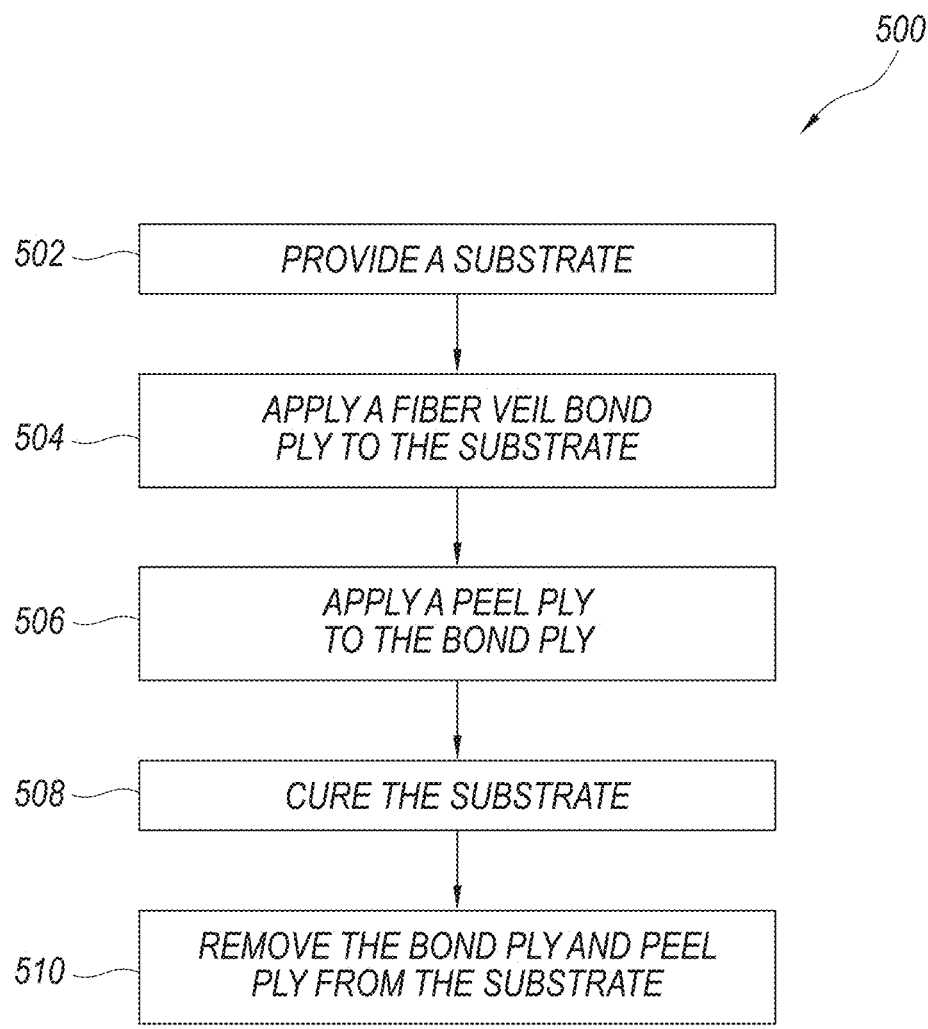
FIG. 5 is a block diagram illustrating another method of forming a composite material in accordance with embodiments of the technology.

FIG. 5 is a block diagram illustrating another method 500 of forming a composite material in accordance with embodiments of the technology. At block 502, the method 500 includes providing a substrate. At block 504, the method 500 includes applying a bond ply to the substrate, where the bond ply comprises a fiber veil of randomly-oriented fibers. In some embodiments, the fiber veil comprises one or more of glass, carbon, one or more metals, aramide, or a combination of these materials. In some embodiments, the method 500 includes coating at least one of the substrate or the bond ply with a templating or transferring coating.

At block 506, the method 500 includes applying a peel ply to the bond ply. At block 508, the method 500 includes curing the substrate. In some embodiments, curing the substrate comprises infusing the bond ply and peel ply with resin from the substrate.

At block 510, the method 500 includes removing the bond ply and the peel ply from the substrate. In some embodiments, removing the bond ply and peel ply from the substrate comprises exposing a fractured active surface of the substrate. In some embodiments, the method 500 further includes applying a room temperature adhesive to the active surface.

The technology disclosed herein offers several advantages over existing systems. For example, the bond ply based surface preparation described above can provide high joint stiffness and superior fatigue performance of the bonded segment. Composite adherends prepared with bond ply techniques can be compatible with paste adhesives activated at any temperature (including room temperature). Further, the technology disclosed herein can improve surface bonding without reliance on exposed fibers on the active surface. These attributes offer a significant advantage over traditional peel ply surface preparation procedures on composite adherends that produce successful adhesive bonds when bonded at elevated temperatures, but not at room temperature. Material and manufacturing costs can be reduced by accommodating a wider variety of adhesives and not requiring a temperature constraint during the paste application step of manufacturing. Further, the bond ply methods described herein eliminate the need for abrasive surface preparation, such as sanding and grit blasting, which are procedures currently required to produce high quality room temperature bonds with epoxy-based adhesives. Abrasive surface preparations are traditionally time- and labor-consuming, and the results are highly operator-dependent.

From the foregoing it will be appreciated that, although specific embodiments of the technology have been described herein for purposes of illustration, various modifications may be made without deviating from the spirit and scope of the technology. For example, while the bond ply surface preparation methods described herein have been discussed with the use of various types of substrates, resins, or materials, in further embodiments the bond ply surface preparation methods can be used with any material or technique associated with traditional peel ply or release film technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

I claim:

1. A method of forming a composite material, the method comprising:
   providing an uncured substrate;
   applying a bond ply to the substrate, the bond ply comprising a fiber veil or fiber mat of randomly-oriented fibers;
   applying a peel ply to the bond ply, wherein the fibers in the bond ply have a greater tensile strength than fibers in the peel ply;
   curing the substrate;
   removing the bond ply and the peel ply from the substrate, thereby exposing an active surface of the substrate, wherein the active surface comprises a material; and
   fracturing the active surface material.

2. The method of claim 1 wherein applying the fiber veil or fiber mat comprises applying a fiber mat or a fiber veil having fibers consisting of at least one of glass, carbon, one or more metals, aramide, an epoxy-inert fiber, or a combination of these materials.

3. The method of claim 1 wherein applying the bond ply comprises applying a veil of randomly-oriented chopped glass fibers.

4. The method of claim 1 wherein curing the substrate comprises infusing the bond ply and peel ply with a resin, and wherein fracturing the active surface material comprises creating fractures in a portion of the resin infused in the bond ply.

5. The method of claim 1 wherein fracturing the active surface material comprises creating a fracture pattern dependent on one or more of a bond ply material selection, an orientation, length, or density of fibers in the bond ply, or a method of curing the substrate.

6. The method of claim 1 wherein removing the bond ply and peel ply comprises removing the bond ply and peel ply together as a unitary component.

7. The method of claim 1 wherein providing an uncured substrate comprises providing a substrate comprising one or more of an epoxy resin, a thermosetting polymer, or a thermoplastic polymer.

8. The method of claim 1 wherein removing the bond ply and the peel ply from the substrate comprises providing a surface chemistry on the active surface suitable for use with a room temperature adhesive.

9. The method of claim 1 wherein removing the bond ply and the peel ply from the substrate comprises removing the bond ply and peel ply without leaving more than 50% of the fibers as remnants on the substrate.

10. A method of forming a composite material, the method comprising:
    providing a substrate;
    applying a bond ply to the substrate, the bond ply comprising a fiber veil or fiber mat of randomly-oriented fibers;
    after applying the bond ply to the substrate, applying a peel ply to the bond ply, wherein the fibers in the bond ply have a greater tensile strength than fibers in the peel ply;
    curing the substrate; and
    removing the bond ply and the peel ply from the substrate, thereby exposing an active surface of the substrate and fracturing a material of the active surface.

11. The method of claim 10 wherein applying the fiber veil or fiber mat comprises applying a fiber veil or fiber mat of randomly-oriented fibers consisting of one or more of glass, carbon, one or more metals, aramide, an epoxy-inert fiber, or a combination of these fibers.

12. The method of claim 10 wherein fracturing the active surface comprises creating a fracture pattern in an epoxy layer on the substrate.

13. The method of claim 10 further comprising applying a room temperature adhesive to the active surface.

14. The method of claim 10, further comprising coating at least one of the substrate or the bond ply with a templating or transferring coating.

15. The method of claim 10 wherein removing the bond ply and the peel ply from the substrate comprises removing the bond ply and peel ply without leaving more than 50% of the fibers as remnants on the substrate.

* * * * *